United States Patent [19]

Tuma et al.

[11] Patent Number: 5,469,702
[45] Date of Patent: Nov. 28, 1995

[54] METHOD AND APPARATUS FOR FILTERING ENGINE EXHAUST

[75] Inventors: Daniel L. Tuma, Minneapolis, Minn.; Jacques V. Van Peteghem, Brugge; Olivier H. Ronneau, Chapelle-Lez-Herlaimont, both of Belgium

[73] Assignee: Donaldson Company, Inc., Minneapolis, Minn.

[21] Appl. No.: 364,506

[22] Filed: Dec. 27, 1994

Related U.S. Application Data

[63] Continuation of Ser. No. 923,232, Jul. 31, 1992, abandoned.

[51] Int. Cl.$^6$ .................................................. F01N 3/02
[52] U.S. Cl. ........................................................ 60/311
[58] Field of Search ............................ 60/311, 320; 55/310

[56] References Cited

U.S. PATENT DOCUMENTS

| | | | |
|---|---|---|---|
| 3,100,146 | 8/1963 | Huntington | 60/311 |
| 3,153,579 | 10/1964 | Levey et al. | 60/311 |
| 3,222,140 | 12/1965 | Scivally et al. | 23/288 |
| 3,666,422 | 5/1972 | Rossel | 60/311 |
| 3,738,089 | 6/1973 | Brill | 55/310 |
| 3,831,377 | 8/1974 | Morin | 60/311 |
| 3,967,445 | 7/1976 | Manfredi | 60/320 |
| 4,319,453 | 3/1982 | Mann | 60/311 |
| 4,732,678 | 3/1988 | Humbert | 210/440 |

FOREIGN PATENT DOCUMENTS

| | | |
|---|---|---|
| 0058546 | 8/1982 | European Pat. Off. . |
| 2068258 | 8/1981 | United Kingdom . |
| 9112417 | 8/1991 | WIPO . |

*Primary Examiner*—Noah P. Kamen
*Attorney, Agent, or Firm*—Merchant, Gould, Smith, Edell, Welter & Schmidt

[57] ABSTRACT

A filtering apparatus (12) includes a filter cartridge (28) which may be replaced or cleaned and re-used. The filter apparatus also includes a heat exchanger (62) which receives cooling air to cool the exhaust prior to filtering. The cooled exhaust does not pose combustion problems for soot or the filter material in the cartridge (28). In addition to cooling the exhaust, a temperature-sensitive valve (36) opens and closes to prevent excessively hot exhaust gas from reaching the filter cartridge (28). The valve (36) includes bi-metal discs (52) which bow outward when the temperature increases and flatten when the temperature decreases. The discs engage a cover to an orifice and slide axially to open and close the valve (36). The apparatus also may include a back pressure valve (72) which will open when the exhaust flow is backed up to prevent damage to the engine.

16 Claims, 4 Drawing Sheets

METHOD AND APPARATUS FOR FILTERING ENGINE EXHAUST

This is a continuation of application Ser. No. 07/923,232, filed Jul. 31, 1992 abandoned.

BACKGROUND OF THE INVENTION

1. Field of the Invention

The present invention relates to a filtering apparatus for engine exhaust, and in particular, to a filtering apparatus having a reusable filter element and a heat exchanger which is particularly well-suited to filtering diesel soot. A heat override valve and back pressure valve may also be included.

2. Description of the Prior Art

As concern for the environment increases, greater attention is being given to systems for eliminating damaging discharges from internal combustion engines. In the workplace, pollution created by combustion engines threatens the health of workers, as the particulate and other compounds contained in diesel exhaust may be carcinogenic. The problem is especially troublesome in enclosed environments such as warehouses or factories wherein diesel forklifts are often utilized. Fork lifts and other diesel engines are often operated in a cycling manner, that is, at maximum power for short periods which quickly raises engine and exhaust temperatures. Prior devices have not worked effectively during cycling to filter the exhaust. In addition, prior filtering units have generally been too expensive, ineffective, or too difficult to service.

Since the most efficient pleated filter material for filtering exhaust gases may have a maximum operating temperature, there must be safeguards to prevent the filter from igniting due to the hot exhaust gases. Therefore, when a predetermined temperature is exceeded, the exhaust gases must be redirected away from the filter to prevent combustion. Preferably, the problem of overheating is avoided by keeping the exhaust temperature below the ignition temperature of the soot and/or filter element. Prior devices have had no way of cooling the exhaust to prevent excessive temperature build up.

Should the exhaust temperature exceed a predetermined level, there has not been a satisfactory valving arrangement for redirecting the exhaust gases to prevent ignition of the filter element. Prior filtering apparatuses have not included temperature override devices to prevent filter ignition.

It can be seen then, that an improved filtering apparatus is needed which provides an effective reusable and replaceable filter element and which prevents overheating of the exhaust gases and includes safeguards to prevent ignition of the filter element.

SUMMARY OF THE INVENTION

The present invention is directed to a filtering apparatus, and in particular to a filtering apparatus for removing soot from engine exhaust. The present invention is particularly well suited for cleaning exhaust from diesel engines. In addition, the device includes an apparatus for cooling the exhaust prior to filtering and for re-directing the exhaust away from the filter should the exhaust temperature exceed a predetermined level.

The present invention includes a pleated filter cartridge for removing particulates and soot from the exhaust gas. The pleated filter material of the cartridge removes up to 99.5% of the particular material from the exhaust gas and traps the particulate on the interior of a filter cartridge. When the filter cartridge becomes loaded with soot, the cartridge is sealed at the ends with the soot inside the cartridge so that workers are not exposed to the soot when the cartridge is handled. The filter cartridges are replaced when loaded with soot after extended periods of use, or, following cleaning, the filter cartridges may be repeatedly re-used without loss of efficiency.

The exhaust gas is directed to the interior of the filter cartridge through a perforated acoustic tube which functions to attenuate the sound from the engine and exhaust system. Flow may be redirected so that exhaust does not enter the cartridge by a temperature override valve. The override valve closes the flow path through the perforated tube when the exhaust temperature reaches a predetermined level. The temperature override valve uses axially deflecting washer-type discs made of two different metals that expand at different rates when heated to push a plunger to close off the exhaust flow. The discs contract when the temperature decreases to an acceptable level, thereby re-opening the valve. In this manner, the filter is protected from excessive heat which may cause combustion of the filter material and/or the soot in the filter cartridge.

When the flow through the perforated acoustic tube to the filter cartridge has been cut off, resulting from closing of the temperature override valve, exhaust backs up in the exhaust system to a back pressure valve. When a predetermined pressure is reached, the valve opens to allow the exhaust gas to escape, thereby preventing damage to the engine from excessive back pressure.

The exhaust gas is cooled so that the temperature override valve does not close in the normal range of operating conditions. According to the present invention, the exhaust gas flows from the engine through an air-to-air heat exchanger. Air from the engine's cooling fan blows over the heat exchanger as exhaust gas passes through cooling tubes of the heat exchanger. In addition, the cooling tubes have heat-dissipating fins placed thereon to aid in removing the heat from the gas. The cooled exhaust gas then flows to the temperature override valve and to the filter cartridge. It can be appreciated that the cooled exhaust does not pose a threat to ignite the filter cartridge or the soot which may be trapped on the inside of the filter cartridge.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding structure throughout the several views.

DETAILED DESCRIPTION OF THE PREFERRED EMBODIMENT(S)

Figure 1:
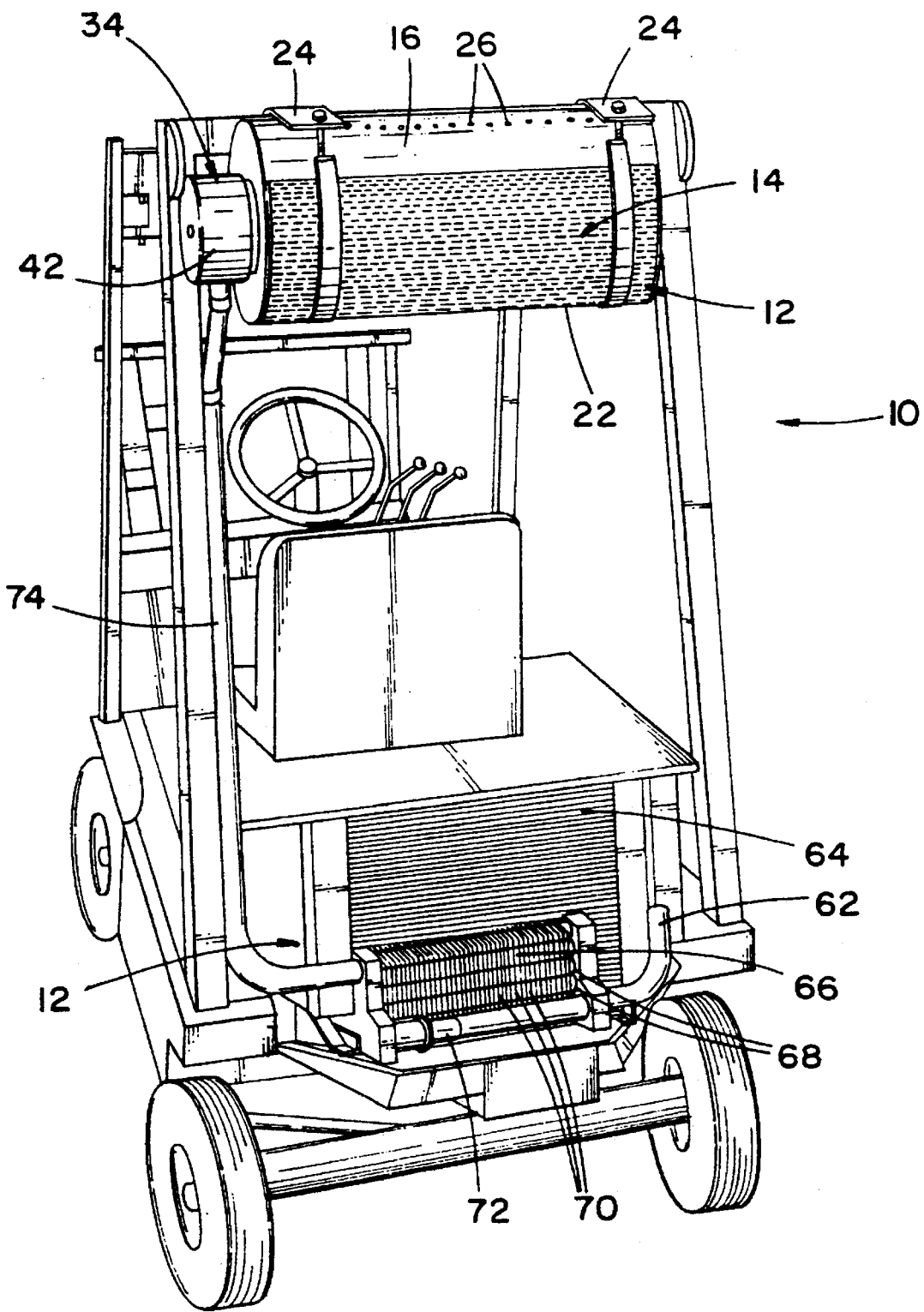
FIG. 1 shows a perspective view of a forklift having its counterweight removed and equipped with a filtering apparatus according to the principles of the present invention.
Figure 5:
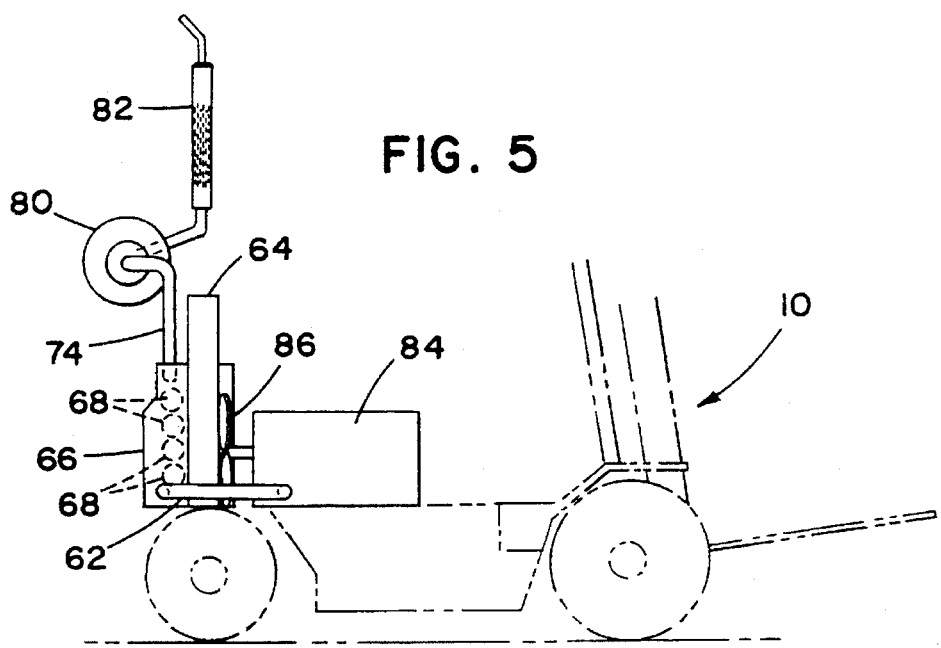
FIG. 5 shows a side diagrammatic view of a second embodiment of a filtering apparatus mounted on a forklift.

Referring now to the drawings, and in particular to FIG. 1, there is shown a forklift vehicle 10, equipped with a filtering apparatus 12. The filtering apparatus 12 includes a filter unit 14 including a filter housing 16 encompassing a filter cartridge. The forklift 10 includes a heat exchanger 66 mounted proximate the radiator 64 of engine 84 and receiving exhaust from the engine 84, as shown in FIG. 5. As shown in FIG. 1, the exhaust gases pass through a series of tubes 68 contained in the air stream of an engine cooling fan 86 for cooling the exhaust. The heat exchanger 66 includes a check type back pressure valve 72 mounted thereon which provides relief from excessive pressure and from excessive heat, as explained hereinafter. The tubes 68 of the heat exchanger include heat dissipating fins 70 to aid in cooling the exhaust.

The heat exchanger connects to an exhaust pipe 74 having a heat guard (not shown). The pipe 74 leads up to the filter unit 14 through an adaptor 34. In a first embodiment, shown in FIG. 1, the filter unit 14 is mounted above the operator, while in a second embodiment, shown in FIG. 5, the filter unit is mounted behind the operator. The adaptor 34 includes a housing 42 enclosing a temperature sensitive override valve 36, as shown in FIGS. 2–4.

Figure 3:
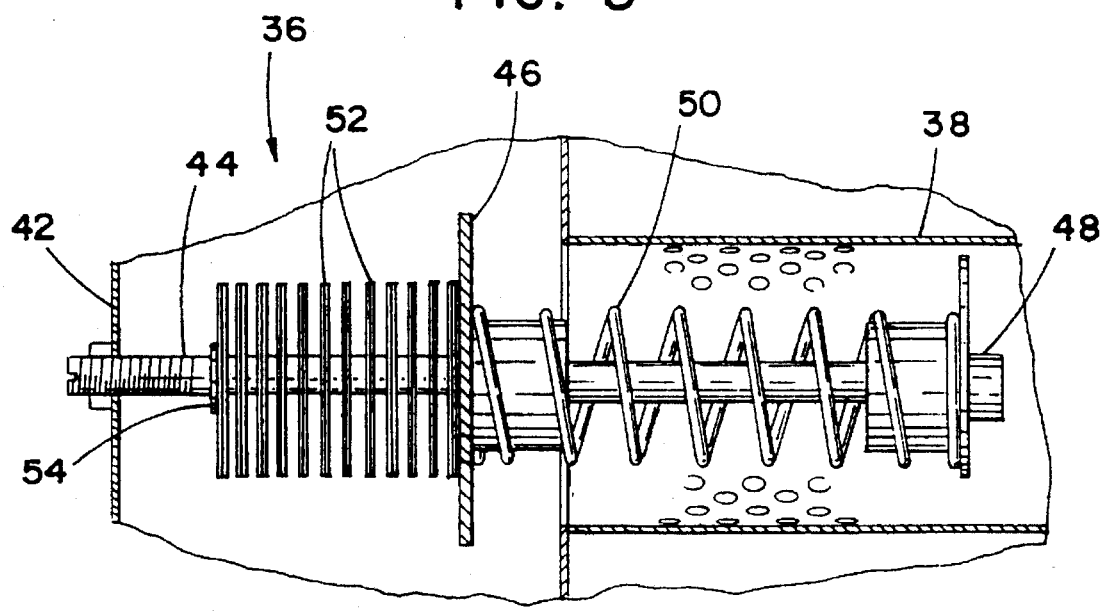
FIG. 3 shows a side view of the temperature override valve in the open position.
Figure 4:
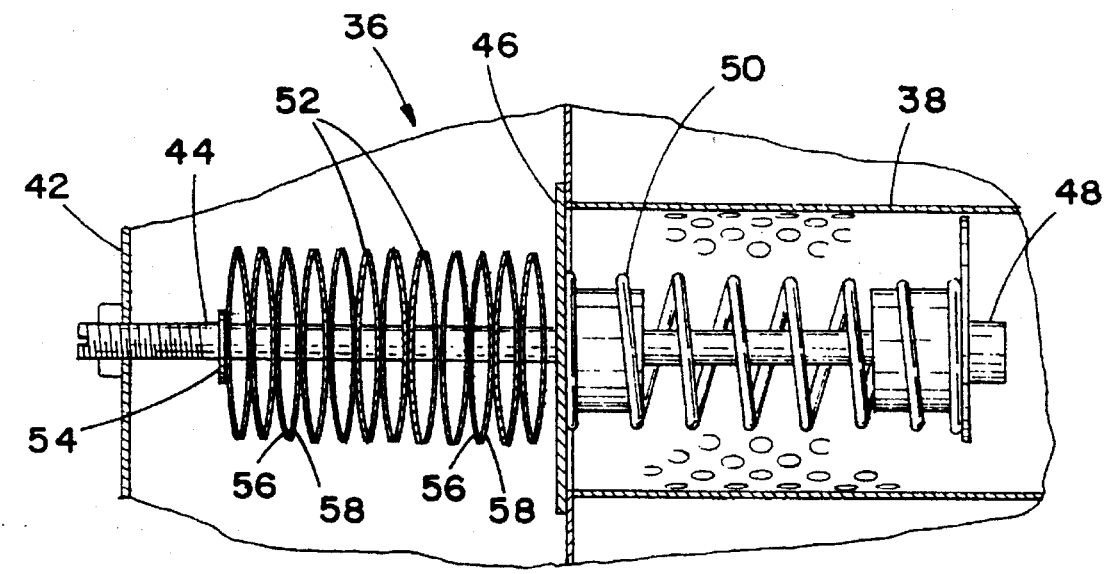
FIG. 4 shows a side view of the temperature override valve shown in FIG. 3 in the closed position.

As shown in FIGS. 3 and 4, the override valve 36 includes a central shaft 44 on which is mounted a sliding plunger 46. The plunger 46 slides to block an entrance to a perforated acoustic tube 38 which aids in sound attenuation. The central shaft 44 includes an end bracket 48 which retains a resistance spring 50 pressing against the plunger 46 and axially aligned bi-metal discs 52. A resistance spring forces the plunger 46 away from the opening to the perforated tube 38 in the normal operating position.

Figure 2:
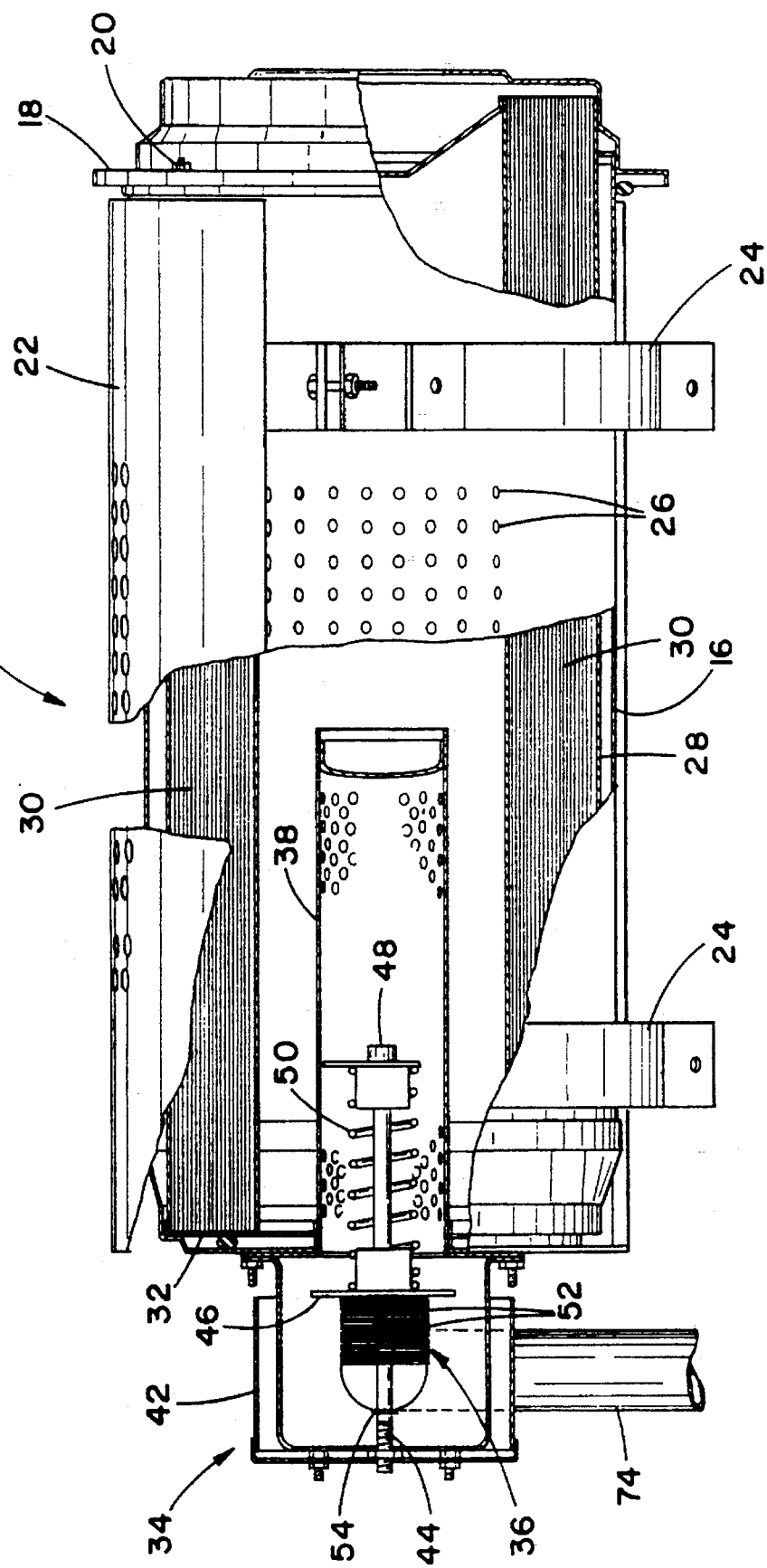
FIG. 2 shows a side elevational view of the filter housing and temperature override valve of the filtering apparatus.

As shown in FIG. 2, the housing 16 of the filter unit 14 includes a removable cover 38 which may be retained by bolts 20 or other easily removable means. In a preferred embodiment, the housing has a heat shield 22 and mounting bracket 24 to protect workers and to provide for positioning the filter unit 14 in a number of mounting configurations.

The housing 16 surrounds a removable filter cartridge 28. The filter cartridge 28 has a cylindrical annular configuration with an annular pleated filter material 30 encompassed by annular end rings 32. The filter cartridge 28 mounts over the perforated tube 38 to receive exhaust gases on its interior side. The filtered gas flows radially outward through the filter material 30 and out through openings 26 in the housing 16 or passes up a stack 82, shown in FIG. 5. The perforated tube 38 includes a large number of orifices distributed over the tube for sound attenuation.

In operation, as shown in FIG. 1, gas flows from the engine through an inlet pipe 62 to the heat exchanger 66. There, cooling air flow from the radiator cooling fan, shown in FIG. 5, is blown over the heat exchanger tubes 68 to cool the exhaust gases. The fan air is circulated over the tubes 68 which also have heat-dissipating fins 70 to help remove heat for cooling the exhaust prior to filtering. In the normal range of operating conditions, the gas will flow from the heat exchanger and be directed up the riser pipe 74.

Upon reaching the top of the riser pipe 74, the cooled exhaust gas will enter the adaptor housing 42 and flow through the opening to the perforated tube 38. The gas then passes through the filter cartridge 28 before being vented to the atmosphere through orifices 26.

As shown in FIG. 5, in a second embodiment of the invention, a filter unit 80 is mounted on the forklift 10 behind the operator. The filter unit 80 directs filtered exhaust up through a stack 82 and then to the atmosphere.

The flow pattern, under normal conditions, takes the gas through the temperature override valve 36 in an open position, as shown in FIGS. 2 and 3. However, when conditions are such that the engine is overworked such as when hydraulic stall occurs, the exhaust gas may reach temperatures which may come close to or exceed that needed to cause combustion of the pleated filter material 30 and trapped soot. Therefore, the hot exhaust gas must be directed away from the filter cartridge 28 so that combustion of the soot or filter material 30 does not occur.

As shown in FIGS. 3 and 4, the bi-metal discs 52 of the temperature override valve 36 contain a first metal 56 affixed to a second metal 58. When the temperature rises from hot exhaust gas, the different expansion rates of the two metals 56 and 58 on each disc 52 cause the bi-metal discs 52 to deflect axially outward. The bowing discs 52 move the plunger 46 to the opening to the perforated tube 38, as shown in FIG. 4. When this occurs, the flow path to the perforated tube 38 and filter cartridge 28 closes. In the preferred embodiment, the valve 36 closes at about 220° C. Therefore, gas is not allowed to reach the filter cartridge 28 and vent to atmosphere. With the valve 36 closed, the pressure builds up back through the exhaust system to the heat exchanger 66. When the exhaust back pressure exceeds a predetermined level, the back pressure valve 72 proximate the heat exchanger 66 opens so that flow may be directed to atmosphere. Therefore, the back pressure does not damage the engine. In the preferred embodiment, the back pressure valve opens at pressures of about 6–8 cm Hg.

When the temperature of the exhaust cools down so that the bi-metal discs 52 deflect to a flattened non-bowed position, the resistance spring 50 presses the plunger 46 back to the position shown in FIG. 3. The flow path to the perforated tube 38 and filter cartridge 28 again opens. The back pressure valve 72 then closes from the reduced pressure so that the flow path again directs all of the exhaust through the filter cartridge 28. It can be appreciated that in this manner, exhaust is always filtered, except under extreme conditions when excessive heat build-up occurs. It can also be appreciated that the present invention provides for safety overrides which prevent damage to the engine and prevent the pleated filter material 30 from igniting.

The pleated filter material 30 is used in the cartridge 28 as it is proved to be very efficient at filtering diesel particulate and retaining the soot from diesel engines. The efficiency has been obtained at over 99.5%. In addition, by removing the cover 18 from the housing 16, the filter cartridge may be removed and the cartridge 28 may then be cleaned and reused repeatedly with no loss of efficiency. The cartridge 28 is easily accessed and may be easily replaced by removing the cover 18. It can also be appreciated that by utilizing the cartridge 28 and covering the ends, the soot is retained on the interior of the filter cartridge so that exposure to hazardous soot material during handling of the cartridge 28 is prevented.

Figure 6:
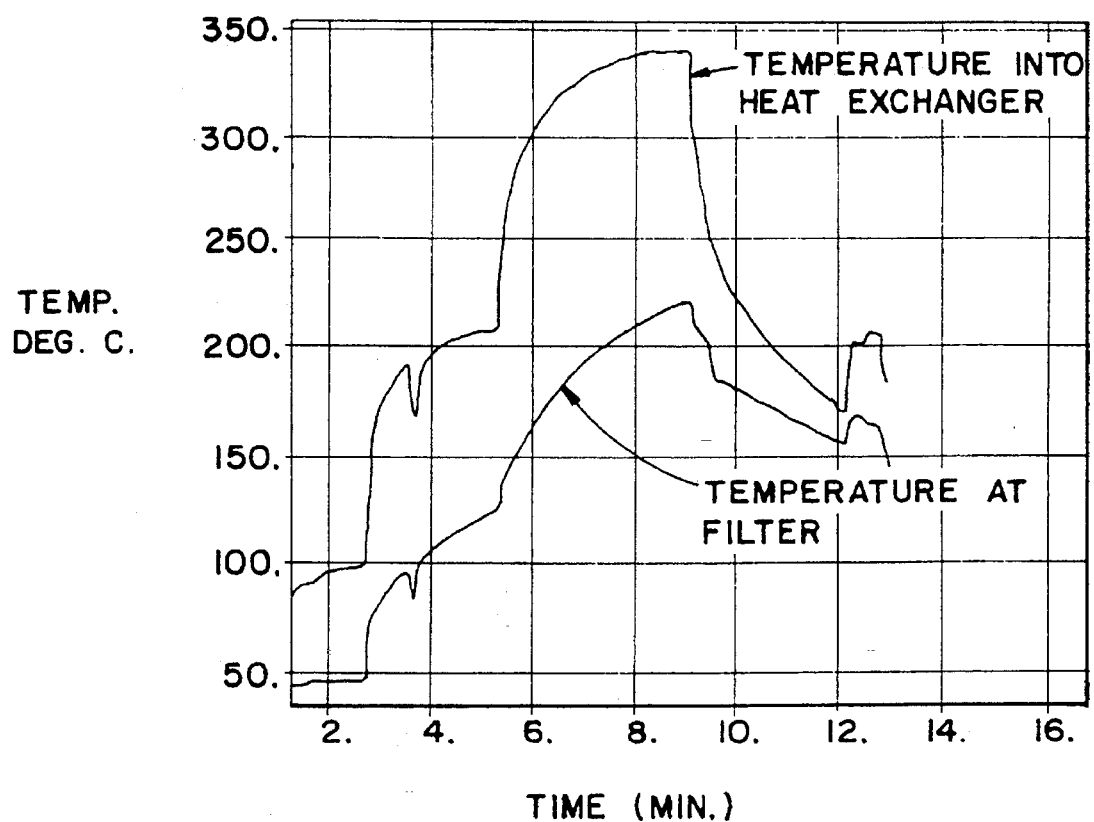
FIG. 6 shows a graph of exhaust temperature for a motor in hydraulic stall without cooling and utilizing exhaust cooling according to the principles of the present invention.

In FIG. 6, there is shown a comparison of engine exhaust temperature over time for exhaust gas prior to passing through a cooling apparatus and for a exhaust gas following passing through an apparatus according to the principles of the present invention. For the graph shown, a forklift was placed in hydraulic stall, that is the engine is operating under maximum power. The temperature for the non-cooled exhaust is much higher than the cooled exhaust. The maximum temperature of the cooled exhaust remains more than 100° C. cooler than the non-cooled exhaust gas. It can be appreciated that this temperature is not high enough to cause ignition of the pleated filter material, whereas non-cooled exhaust under such conditions may risk igniting the filter.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter apparatus for exhaust gases from an engine, comprising:

exhaust cooling means for cooling the exhaust gases after the gases leave the engine; and, filtering means for filtering the cooled exhaust gases; and, temperature override means, wherein the temperature override means comprises a temperature sensitive valve, wherein the valve includes a plurality of axially-aligned bi-metal discs deflecting axially as the temperature increases, and a plate mounted to a deflected end disc, thereby moving the plate axially between an open and closed position.

2. A filter apparatus according to claim 1, wherein the filtering means are replaceable and reusable.

3. A filter apparatus according to claim 2, wherein the filtering means comprise a filter cartridge in a filter housing.

4. A filter apparatus according to claim 1, further comprising temperature override means for redirecting flow when the exhaust gas temperature exceeds a predetermined temperature.

5. A filter apparatus according to claim 1, further comprising back pressure release means for releasing the exhaust gases and providing release of the back pressure at a predetermined pressure.

6. A filter apparatus according to claim 1, wherein the exhaust cooling means comprises a heat exchanger receiving exhaust from the engine.

7. A filter apparatus according to claim 6, wherein the heat exchanger comprises a plurality of tubes proximate a cooling fan of the engine, wherein the exhaust is circulated through the tubes.

8. A filter apparatus according to claim 7, further comprising heat-dissipating fins mounted on the tubes.

9. A valve apparatus, comprising:

a valve body including an opening;

a movable cover;

a plurality of axially aligned bi-metal discs attached to the cover, wherein the discs bow out and flatten axially as the temperature increases and decreases, thereby moving the valve cover to open and close the valve;

a retaining spring for positioning the cover, wherein the bi-metal discs are positioned on a first side of the cover and the spring is positioned on a second side of the cover.

10. A filter apparatus for filtering exhaust gases from an engine, comprising:

exhaust cooling means for cooling the exhaust gases prior to the gases from the engine;

a removable and reusable pleated filter cartridge in a filter housing; and, temperature override means for directing exhaust gases away from the filter cartridge upon reaching a predetermined temperature comprising a plurality of axially aligned bi-metal discs positioned in the exhaust flow expanding axially as the temperature increases and a valve cover mounted to a moving end disc; and, back pressure release means for releasing the exhaust gases prior to filtering upon exceeding a predetermined pressure.

11. A filter apparatus according to claim 10, wherein the exhaust cooling means comprises a heat exchanger receiving exhaust from the engine.

12. A filter apparatus according to claim 10, wherein the temperature override means comprises a temperature sensitive valve, wherein the valve includes bi-metal discs bowed as the temperature increases and attached to a cover, thereby moving the cover and closing the valve as the temperature increases.

13. A filter apparatus according to claim 10, wherein the exhaust cooling means comprises a heat exchanger receiving cooling from an engine cooling fan and circulating cooling air over tubes containing the exhaust gas.

14. A filter apparatus for filtering exhaust gases from an engine, comprising:

a replaceable filter cartridge for filtering the exhaust gases; and, a temperature sensitive override valve for redirecting the exhaust gases when a predetermined temperature is exceeded, the temperature override valve located proximate the filter downstream in the exhaust flow from the engine and preceding the filter cartridge, comprising:

a valve body including an opening;

a movable cover;

a plurality of axially aligned bi-metal discs in a chamber defined by the valve body, wherein the discs bow out and flatten axially as the temperature increases and decreases;

a valve cover slidably mounted in the chamber to an axial end of the discs, wherein the valve cover moves between a first position wherein the valve is open and a second position wherein the cover closes the opening when the discs bow out;

a retaining spring for positioning the cover, wherein the bi-metal discs are positioned on a first side of the cover and the spring is positioned on a second side of the cover.

15. A filter apparatus according to claim 14, further comprising a check-type back pressure valve upstream from the temperature override valve in the exhaust flow, wherein the back pressure valve opens when a predetermined pressure is attained.

16. A filter apparatus according to claim 14, further comprising heat exchanging means for cooling the exhaust gases after the exhaust gases leave the engine and prior to filtering.

* * * * *